United States Patent Office.

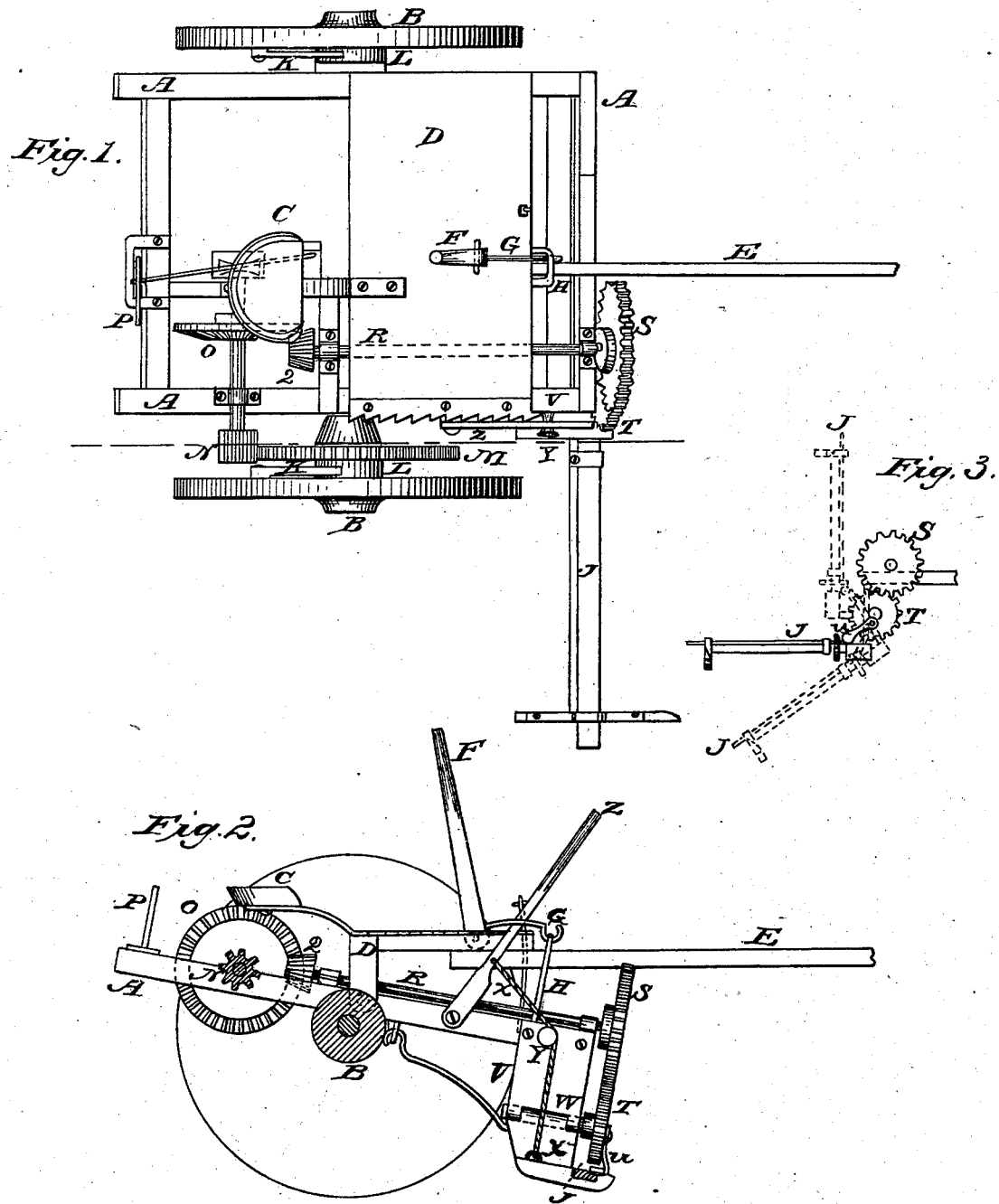

GEORGE M. JACKSON, OF NORTH HECTOR, NEW YORK.

Letters Patent No. 72,046, dated December 10, 1867.

IMPROVEMENT IN HARVESTERS.

The Schedule referred to in these Letters Patent and making part of the same.

TO ALL WHOM IT MAY CONCERN:

Be it known that I, GEORGE M. JACKSON, of North Hector, Schuyler county, State of New York, have invented new and useful Improvements in Harvesters; and I do hereby declare the following to be an exact description thereof, reference being had to the accompanying drawings, and to the letters of reference marked thereon, making a part of this specification, in which—

Figure 1 represents a top view of the harvester.

Figure 2, a sectional view of the same.

Figure 3, the positions of the adjustable cutter-bar frame.

The nature of my invention consists in the arrangement and combination of the toothed wheels, crank-box of the hinged frame, finger-bar, and hoisting-chain, with its lever for regulating the upright or angular position of the finger-bar frame, so that the finger-bar can be held up in a vertical position as the machine approaches a tree, or in turning around, or at any angular position to suit the character of the ground, or at a downward position to cut the grass from a steep slope of the side of a hill, whilst the machine is all the while in operation; avoiding the necessity of stopping the machine to shift or unshift the gearing-devices, thus saving much time and labor, and allowing the machine to be light and simple in construction, so as to be drawn by only one horse, accomplishing the work easily and effectually.

A represents the frame, to which the axle and carriage-wheels B are attached. C, the driver's seat, located at the rear end of a hinged or pivoted and adjustable platform, D, to which the tongue or shaft E is attached. The front lever F is for the purpose of raising or lowering the frame in front, by means of the hook G, and eye or clip H, to regulate the front of the frame, so that the finger-bar J may move with the undulations of the surface of the ground, or raised to escape stones or other slight obstructions. Springs K K are attached to the carriage-wheels B B, and work in ratchets L L, on the axles, so as to hold the wheels, when the machine is in motion, and operate the driving toothed wheel M, that gears into the pinion N, that operates the shifting-bevel wheel O, that is shifted or unshifted, when required, by means of the lever P. The bevel-wheel O gears into the pinion Q on the one end of shaft R. On the end of shaft R, in front, is another toothed wheel, S, that gears into toothed wheel T, to which a crank, U, is attached, connecting with the end of finger-bar J, and operates the cutter-bar. Extending down from the side of frame A, is a hinged frame, V, and support for the finger-bar frame, and to which the cutter-bar is firmly fastened, and works with the hinge or box W. The axle of toothed wheel T operates this box W. At the end of finger-bar frame, a chain, X, is fastened, passing over a roller, Y, and fastened to an upright lever, Z, by which means the finger-bar frame is raised or lowered to the required angle or position, and the lever is held by the notched or ratchet end of the platform D.

The driver's seat being located in the centre, between the levers F, P, and Z, the driver, by a mere movement of his hand, controls either lever, and regulates the movement of the machine with perfect ease.

What I claim as my invention, and desire to secure by Letters Patent, is—

The arrangement and combination of the toothed wheels S and T, crank U, box W, of the hinged frame V, adjustable finger-bar J, hoisting-rope or chain Y, and lever Z, when constructed and operated as herein described and for the purposes set forth.

GEORGE M. JACKSON.

Witnesses:
J. FRANKLIN REIGART,
N. M. MATHEWS.